United States Patent [19]
Gould

[11] 3,736,541
[45] May 29, 1973

[54] DETECTOR PROBE FOR MAPPING DISCONTINUITIES IN ELECTROMAGNETIC PATHS

[75] Inventor: Reginald J. Gould, Riverside, Calif.

[73] Assignee: North American Rockwell Corporation, El Segundo, Calif.

[22] Filed: Feb. 28, 1972

[21] Appl. No.: 229,801

[52] U.S. Cl................................336/84, 336/178
[51] Int. Cl...........................H01f 15/04, H01f 17/06
[58] Field of Search................336/84, 178; 324/41; 179/100.2 C

[56] References Cited

UNITED STATES PATENTS

| | | | |
|---|---|---|---|
| 3,534,177 | 10/1970 | Camnas | 179/100.2 C |
| 2,555,110 | 5/1951 | Bobb | 179/100.2 C |
| 1,320,980 | 11/1919 | Bowman | 336/84 |
| 2,724,735 | 11/1955 | Johnston | 336/84 X |

FOREIGN PATENTS OR APPLICATIONS 206,485    1925    Great Britain...................336/84

*Primary Examiner*—Thomas J. Kozma
*Attorney*—L. Lee Humphries, Edward Dugas, Edward E. Roberts and H. Fredrick Hamann

[57] ABSTRACT

An electromagnetic field probe shielded to render the probe non-sensitive to ambient electromagnetic fields. The probe consists of an electromagnetic circuit which includes a ferrite core, an air gap, and a pickup coil surrounding a portion of the ferrite core. The pickup coil and a major portion of the core is electromagnetically shielded by an overlapping wrapping of insulated copper material shielding the circuit everywhere except in the vicinity of the air gap The invention herein described was made in the course of or under a contract or sub-contract thereunder, with the Department of the Air Force.

6 Claims, 3 Drawing Figures

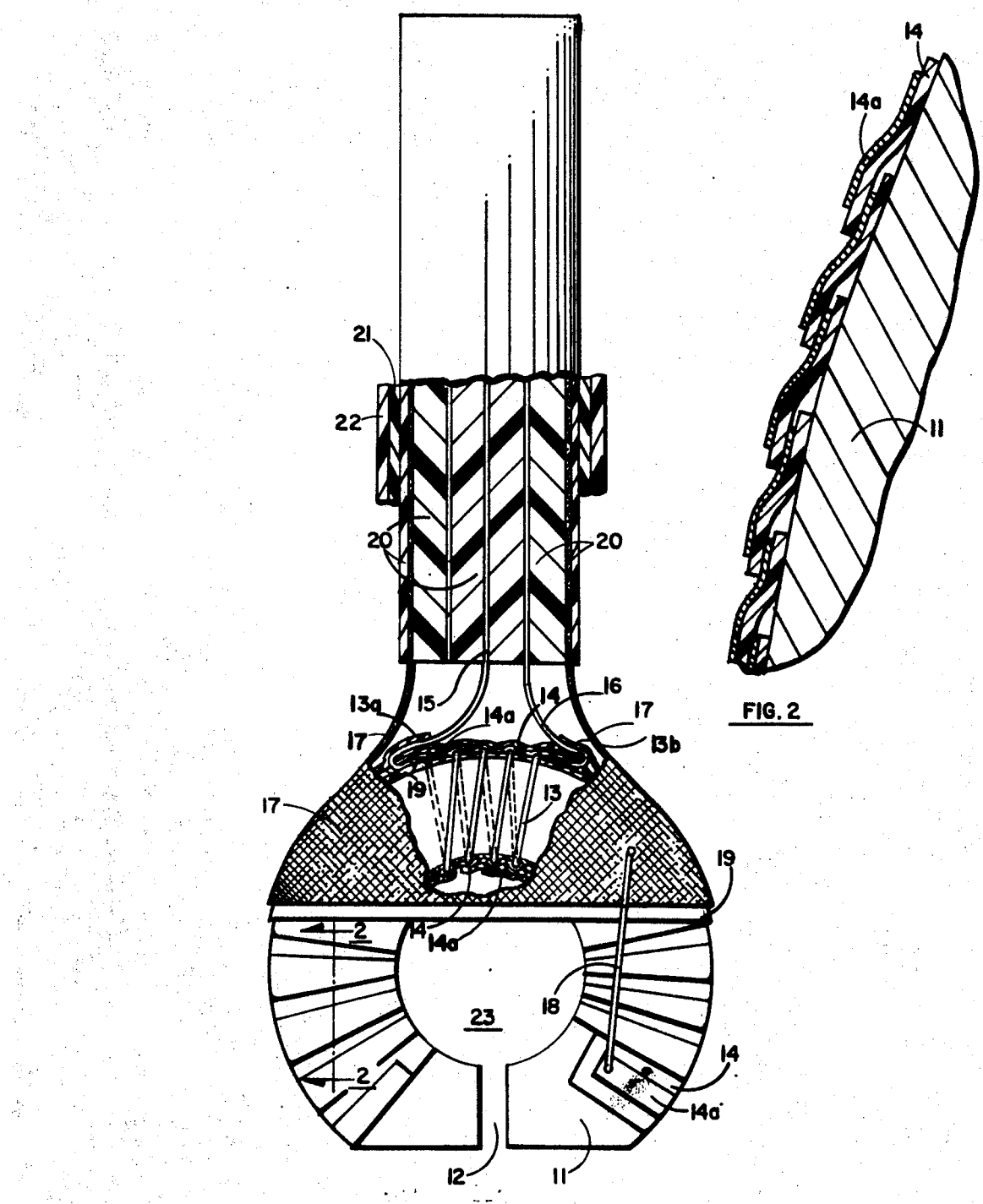

DETECTOR PROBE FOR MAPPING DISCONTINUITIES IN ELECTROMAGNETIC PATHS

BACKGROUND OF THE INVENTION

1. Field of the Invention

The invention relates to apparatus for detecting the presence of discontinuities in electromagnetic paths and more particularly to an improved detector probe sensitive to a small measurement area and insensitive to ambient electromagnetic fields because of appropriate electromagnetic shielding.

2. Description of Prior Art

Electromagnetic field detector probes are presently available for detecting spurious electromagnetic radiation in an enclosed area. They are satisfactory for background measurements and noise measurements but cannot isolate defects to a small area since they do not have high sensitivity to a small measurement area.

Applicant's device is shielded against ambient electromagnetic fields and provides a high sensitivity to a small measurement area.

SUMMARY OF THE INVENTION

According to the present invention, a unique approach to the problem of detection of discontinuities in electromagnetic paths is formulated. Basically, an embodiment of applicant's invention comprises an electromagnetic circuit having a ferrite core, an air gap, and a pickup coil surrounding a portion of the ferrite core. The circuit is electromagnetically shielded by an insulated electrical conductor wrapped in an overlap around the magnetic circuit everywhere except in the vicinity of the air gap. The overlapping turns are non-shorting with respect to each other. The circuit is further shielded by a wire mesh shroud. The shielding provided by the wrapping and mesh renders the circuit insensitive to environmental electromagnetic fields.

It is therefore an object of this invention to provide a new and novel detector probe for detecting spurious electromagnetic energy.

It is another object of the invention to provide a detector probe that has high sensitivity to a small measurement area.

It is still another object of the present invention to provide an accurate detector probe for detecting discontinuities in electromagnetic fields wherein the probe has high impedance to ambient electromagnetic fields and low impedance to localized point source fields.

These and additional objects of the present invention will become more apparent when taken in conjunction with the following description and drawings in which like characters indicate like parts.

BRIEF DESCRIPTION OF THE DRAWINGS

FIG. 1 is a partially sectioned view of one embodiment of a detector probe in accordance with the present invention.

FIG. 2 is a partially sectioned side elevation view of the overlapping wrapping of the probe of FIG. 1.

DESCRIPTION OF PREFERRED EMBODIMENT

Figure 3:
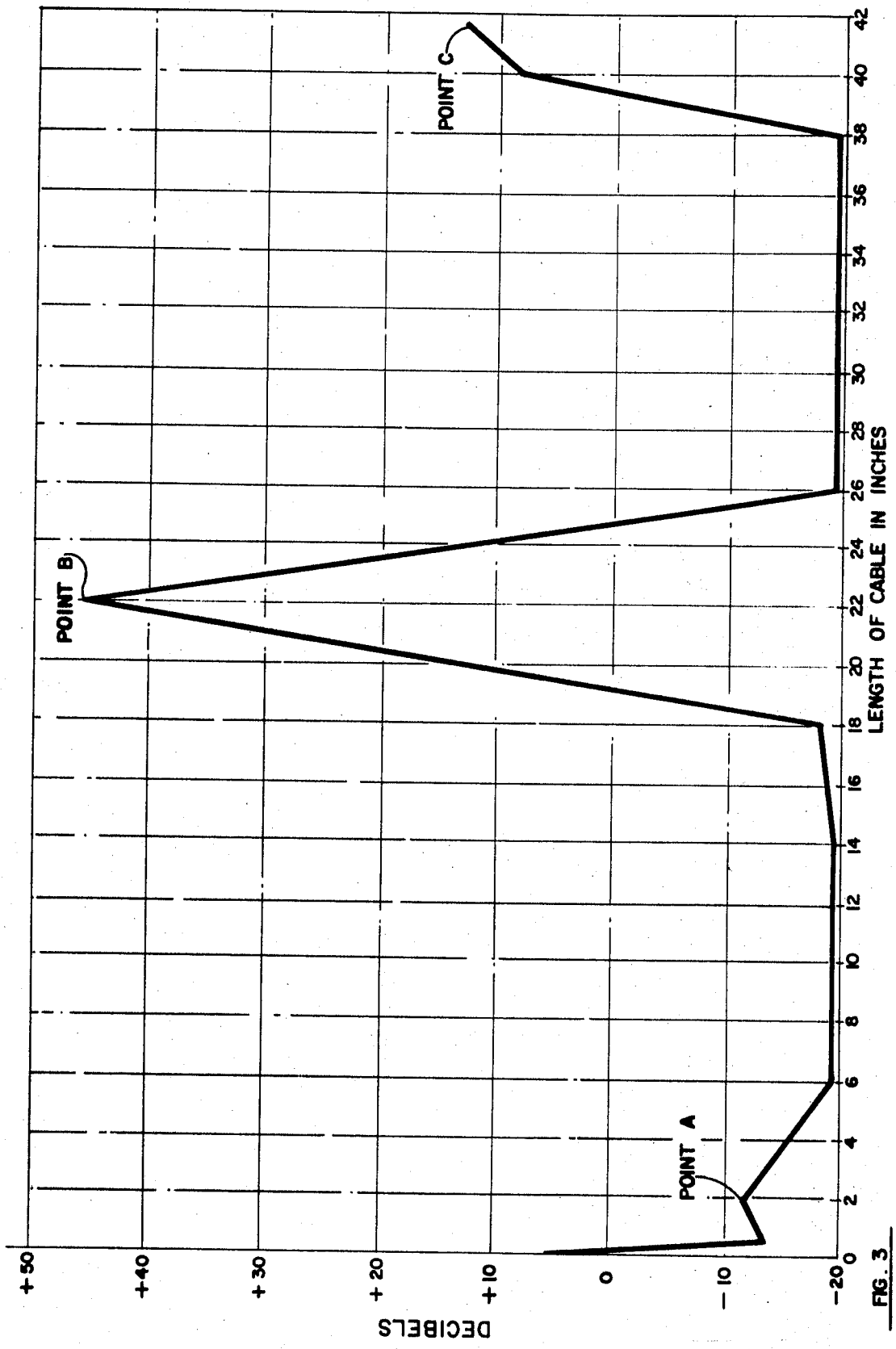
FIG. 3 is a graph of data taken using applicant's invention to detect and locate a hole in a test cable.

Referring to the drawings and more particularly to FIG. 1 thereof, there is illustrated detector probe 10 in accordance with the present invention. The detector probe 10 has a toroidal magnetic core 11 in which there is an air gap 12. Pickup coil 13 is electrically insulated from and coiled around magnetic core 11. Core 11 and coil 13 are electromagnetically shielded by a wrapping of electrically conductive material such as copper 14a to which is attached electrical insulation 14. The wrapping is continuous and fashioned to form overlapping of successive turns of the copper material 14a. Insulation 14 provides continuous electrical insulation of the material 14a. The overlapping wrapping concept is shown in FIG. 2. Magnetic core 11 and coil 13 are by shielding 14, 14a everywhere except in the vicinity of air gap 12. Coil portions 13a and 13b of coil 13 can be laid back flat along core 11 in a direction perpendicular to the direction of wrap to improve the required electromagnetic shielding. As coil 13 is approached, the wrapping is brought up to physically contact the coil and then wrapped over the portion of the coil laid back flat along the core 11, then over the remainder of the coil including the other laid back portion, then over the remainder of the core 11.

FIG. 1 further shows electrical conductors 15, 16, and 17 electrically connected to coil 13 and to material 14a. Inner conductor 15 is connected to one side of coil 13 and middle conductor 16 is connected to the other side of the coil to provide an electrical output for applicant's device. Outer conductor 17 is a electrically conductive material shrouded over pickup coil 13 and portions of core 11 and shielding 14, 14a for additional shielding and connected to material 14a by conductive connective strip 18. Conductor 17 is further connected to electrical ground. Insulation 19 is provided to insulate material 14a from the shrouded portion formed by outer conductor 17. Insulation materials 20 electrically insulates conductors 15, 16, and 17. A 50 ohm impedance triax shielded cable is adequate for forming conductors 15, 16 and 17.

Applicant's device may then be encapsulated by a probe holder which may consist of a hardenable potting material 21 and an outer sheath cover 22. A suitable potting material is silicon rubber or a suitable resin. Cover 22 can be any suitable packaging material such as plastic sheathing. For strength, the potting material can be placed within the air gap 12 and the hollow area 23 within the core 11.

A suitable magnetic core 11 for detector probe 10 is a ceramic powder iron core 1 inch in diameter by one quarter inch thick such as part number 57-0158 manufactured by Stack Pole. The air gap 12 may typically be three thirty-seconds of an inch wide. An inductance of 10 microhenrys is suitable for pickup coil 13. Coil shield 14, 14a must be wrapped to maximize shielding integrity and may be formed by overlapping turns of insulated copper strands wound around core 11 with non-shorting turns.

The air gap 12, the inductance of pickup coil 13, and the core size and material of magnetic core 11 may be varied depending upon the frequency response, sensitivity and application desired.

The detector probe of the applicant is useful to detect shielding discontinuities in electromagnetic energy conductors. For instance, to detect defects in R.F.I. cables through which electromagnetic energy is flowing the probe is moved along the cable until it approaches a shielding defect in the cable. The electromagnetic energy radiating from the defect envelopes the probe and cooperates with core 11 to generate a signal in pickup coil 13. The probe is then moved around the cable to pinpoint the defect.

When applicant's device is brought into close proximity with, and exposed to a point source of electromagnetic energy, such as a pin-hole defect in an electromagnetic energy conductor, the unshielded portion of the magnetic core 11 of applicant's device acts as a small window through which the escaping energy may pass. In response to the escaping energy, magnetic lines of flux are generated in the magnetic core 11 proportional to the strength of the energy. Shielded pickup coil 13 responds to the magnetic lines of flux to generate a signal voltage indicative of the defect.

Since applicant's probe is designed to be insensitive to the ambient field of electromagnetic energy, applicant's probe therefore encounters a field of sufficient magnitude to provide an output of selected level only in the area of the defect.

FIG. 3 shows responsive readings obtained from an R.F.I. cable 42 inches long in which there has been drilled a hole with a number 40 drill to simulate a defect. The probe output is plotted for various points along the length of the cable under test. Point A shows the electromagnetic leak at the wall flange where the cable was connected to the energy source. Point C shows the electromagnetic leak at the other end of the cable where it was connected to a load. Point B shows the reading responsive to the number 40 drill hole drilled 22 inches from a wall flange.

It is thus seen that applicant's probe is highly sensitive to close proximity point source electromagnetic energy and insensitive to the ambient electromagnetic field.

Applicant's invention therefore provides an improved device for mapping discontinuities in electromagnetic paths, the device being insensitive to the ambient field and responsive to the electromagnetic energy in the area of a defect.

While there has been shown what is considered to be the preferred embodiment of the invention, it will be manifest that many changes and modifications may be made therein without departing from the essential spirit of the invention. It is intended, therefore, in the annexed claims, to cover all such changes and modifications as may fall within the true scope of the invention.

What is claimed is:

1. Apparatus for detection of discontinuities in electromagnetic paths comprising:

magnetic toroidal core means having an air gap and responsive to sensed electromagnetic energy to provide magnetic lines of flux therein;

electrical conductor coil means wound around a portion of said core means and spaced substantially equidistant from said air gap, said coil responsive to said magnetic lines of flux present in said core means to provide an electrical output which is indicative of the strength of said electromagnetic energy;

electromagnetic shielding means comprising first shielding means for providing shielding for said coil means and for said magnetic core means except in the vicinity of said air gap, and second shielding means comprising an electrically conductive wire mesh shroud fitted over said first shielding means and over the portion of said core means around which said coil means is wrapped to provide additional shielding of said apparatus from ambient electromagnetic fields whereby said electrical output is generated only in response to said magnetic lines of flux in said core.

2. The invention of claim 1 wherein said first shielding means comprises electrical conductor means spirally wrapped about said core means and said coil means with a single direction of lay, each wrap of said conductor means insulated one from the other and wrapped to provide an overlap of a prior wrap by each succeeding wrap and commencing in the vicinity of one side of said air gap and continuing to the vicinity of the other side of said air gap.

3. The invention of claim 2 wherein said shroud is electrically connected to said electrical conductor means at a selected point and to electrical ground, said mesh electrically insulated from said core and said coil.

4. Apparatus for detection of discontinuities in electromagnetic paths comprising:

a ferrite core substantially circular in shape with an air gap, said core being sensitive to electromagnetic energy to generate magnetic lines of flux therein;

a coil wound around said core substantially equidistant from each side of said air gap, said coil having output leads at each end formed to lay along said core a selected distance before departing from said core, said coil being responsive to magnetic lines of flux in said core to generate an electrical output for said apparatus;

strands of electrically conductive material wrapped around said core means and said coil means, including said coil output leads formed to lay along said core, with a single direction of lay commencing in the vicinity of one side of said air gap and continuous to the vicinity of the other side of said air gap, said material providing an electromagnetic shield for said core and said coil;

said strand material spirally wrapped with subsequent turns overlapping but insulated from prior turns; and an electrically conductive meshed shroud fitted over but insulated from said core, said coil, and said coil output leads to provide additional shielding, said mesh material electrically connected to a selected point of said strand material, said strands of electrically conductive material and said meshed shroud providing an electromagnetic shield for said core and said coil whereby said coil generates said output only in response to said magnetic lines of flux in said core.

5. Apparatus for detection of discontinuities of electromagnetic paths comprising:

a ferrite core having an air gap;

a sensing coil wound about a portion of said core;

means for shielding said coil from both external ambient fields and from fields in said gap, said means comprising a first electrically conductive shield wound about said core and coil and having end portions respectively adjacent to and spaced from opposite sides of said air gap, said shield having a portion interposed between said coil and said gap; and a shielded cable connected to said coil, said cable comprising first and second inner conductors connected to respective ends of said sensing coil, and an outer conductor formed of a mesh shield, said mesh shield surrounding said inner conductors and at least the ends of the sensing coil connected thereto.

6. The apparatus set forth in claim 5 including electrical insulation means positioned between said first shield and said mesh shield and means for electrically connecting said first shield to said mesh shield.

* * * * *